IMAGE PICKUP DEVICES

Filed June 9, 1965

INVENTORS
PIETER SCHAGEN
ALEXANDER STARK
BY
[signature]
AGENT

INVENTORS
PIETER SCHAGEN
ALEXANDER STARK
BY
Frank R Trifari
AGENT

INVENTORS
PIETER SCHAGEN
ALEXANDER STARK
BY Frank R. Trifari
AGENT

United States Patent Office 3,444,322
Patented May 13, 1969

3,444,322

IMAGE PICKUP DEVICES

Pieter Schagen, Redhill, and Alexander Stark, Crawley, England, assignors to North American Philips Company Inc., New York, N.Y.

Filed June 9, 1965, Ser. No. 463,476
Claims priority, application Great Britain, June 10, 1964, 18,722/65
Int. Cl. H01j *29/89, 31/26;* H04n *3/16*
U.S. Cl. 178—7.87 13 Claims

ABSTRACT OF THE DISCLOSURE

An infrared image converter that employs a target composed of an infrared energy absorbing material for forming a thermal image thereon and a material that exhibits an absorption edge at a given wavelength. The wavelength of the edge varies with temperature so as to vary the optical transmission characteristic of the material. An infrared image is projected onto the target and a thermal image thereof is formed. The target is scanned with electromagentic radiation of said given wavelength. The target passes said radiation in proportion to the local temperature variations produced by the thermal image. A converter converts the output radiation into a useful electric signal.

Figure 1:
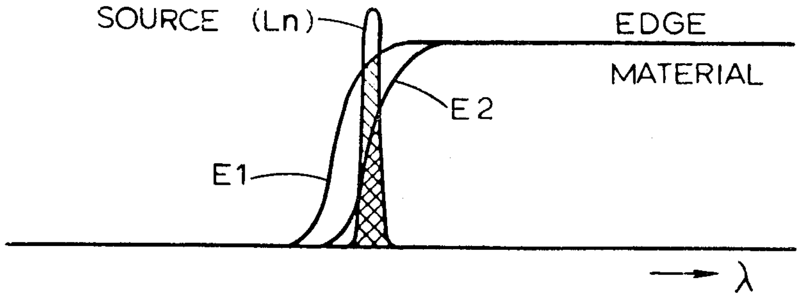

This invention relates to infrared image pickup devices. During the past few years much effort has been devoted to image forming devices for passive night viewing. For this purpose, several image intensifying tubes are now in development, which can lead to a marked perception gain in comparison with night glasses.

The fundamental limitation to the performance of a viewing system employing one of these tubes is in each case the comparatively small number of photons which an object receives from the night sky, of which the reflected fraction can be used for image formation.

A fundamentally different approach is however possible by ignoring reflected radiation, and considering the natural thermal radiation of objects in the scene. The problem with this radiation is that is mainly consists of wavelengths greater than 2 microns, where image conversion to visible wavelengths is no longer possible with the conventional image converter technique that utilizes a photoemissive cathode. On the other hand, a rough estimate of the numbers of photons involved illustrates the enormous gain which could be obtained by employing this radiation.

Infrared radiation is strongly absorbed by water vapour and carbon dioxide in the atmosphere, except in the case of a few wavelength "windows." A study of the amounts of energy, and the number of photons, radiated by black bodies near room temperature in those windows which may be considered for thermal image formation, shows that the $10\mu$ window is most advantageous for viewing objects at room temperature, even though this advantage is somewhat offset by the smaller contrast ratio in the radiation at $10\mu$ in comparison with the shorter wavelengths, when observing objects with small temperature differences.

Of course, the choice of wavelength window also depends on the availability of a suitable detector for that particular band of wavelengths. Two different types of detector are sensitive to infrared radiation of the wavelengths considered. The first type counts individual photons as they are absorbed, and may utilize a photoconductive material. The alternative type makes use of a bolometric approach which utilizes the local temperature variations created by the heat image on a target.

These can give rise to local variations in the particular physical constant of the target material, which exhibits a strong temperature dependence.

A difficulty with the photoconductive approach arises from the large dark currents usually associated with those materials which are sensitive to longer wavelength infrared radiation (even when the detector is cooled to liquid nitrogen temperature). These currents reduce still further the small contrast obtainable and hence the depth of modulation obtainable in a video signal derived from the detector.

It is principally for this reason that the present invention is based on the bolometric approach which utilises the temperature variations on a target which result from temperature differences in the scene.

The final depth of modulation in a video signal corresponding to these temperature variations then depends on their amplitude and the temperature coefficient of the particular physical constant employed. Assuming that the spatial variations in this constant across the target are at least one percent, then the thermal image must give rise to similar variations in order not to be swamped by a "dirty window" effect similar to that which occurs in the case of a photoconductive target. This condition appears to be more readily achievable with a bolometric target, while in addition such a target does not necessarily require cooling although in some cases this may increase the sensitivity. These targets can also be made sensitive to a much larger range of infrared wavelengths.

Bolometric targets have been used with various temperature-dependent parameters for forming images of infrared objects or scenes. In particular, temperature-dependent light absorption has been used to provide images which could be viewed directly by the eye or by a camera tube (W. R. Harding, C. Hilsum and D. C. Northrup: "A New Thermal Image Converter," Nature, 181, p. 691, March 1958).

The present invention provides an infrared image pickup device comprising a bolometric target, that comprises a transmission material with a temperature-dependent transmission coefficient for electromagnetic radiation of a given wavelength, and a material for forming a thermal image of an object or scene in the form of local variations of the temperature of the target. The device also comprises means for scanning said transmissive material with electromagnetic radiation of said wavelength so that successively scanned picture elements of the target transmit dot-sequentially output radiation that is a proportion of this electromagnetic radiation with which it is scanned, said output radiation is modulated by the local variation of said transmission coefficient with temperature. Conversion means are provided for converting said output radiation to a video signal.

In principle the material of the target which is infrared absorbent may be the same as the transmissive material. In this case the target may be formed by a single layer, although in practice layer sections of the material of the target will usually be processed in different ways for the two functions. In other cases, two separate materials may be needed, in which case the transmissive material, must be in close thermal contact with the infrared absorbent material the two materials being, e.g., an intimate mixture or in adjacent layers. Such layer or layers may be self-supporting or may be provided on a carrier layer or plate.

The advantages of introducing scanning into a bolometric infrared pickup system arise mainly because of the low modulation depth in the output radiation, corresponding to the small differences in apparent black-body temperature between different objects. This means that picture processing is particularly desirable, such as contrast enhancement and black-level manipulation. For this purpose the picture must be converted into a television type of video signal before the final reproduction into a visible image. The scanning means used in the device may permit direct derivation of a video signal by a photocell or multiplier with a basically linear characteristic and a large dynamic range. A nonlinear characteristic or small range would be likely to result in reduction of the contrast because the modulations in the light incident thereon occur in the form of small modulations on top of a large D.C. "pedestal." These modulations would be likely to be reduced in amplitude relative to the pedestal, or cut off completely if the cell or multiplier were not of this preferred type.

This makes it possible to process the video signal and manipulate the black-level in various known ways without reducing the signal-to-noise ratio to very low values.

Another advantage of using the scanning technique is that the "dirty window" effect can be more efficiently counteracted by applying a noise reduction device as described and claimed in U.S. Patent 3,328,586.

The patent explains that the presence of spatial noise (by which is meant an unwanted pattern modifying a desired image in a manner which is stable in situation and time) is particularly disadvantageous when the wanted image is low in contrast. Any measures taken to improve the contrast, e.g., by black-level manipulation, will result in increasing the contrast of the noise too. This may mean that there is no net improvement in clarity of the image. The patent describes an image display and/or conversion system including a filter in an image plane of said system. The said filter carries a negative image of spatial noise which would otherwise occur in the displayed or converted image.

The reason why it is more advantageous to apply such a noise reduction device in the case of a photocell or photomultiplier is because the light transmitted by the filter can be diffused before it reaches the photocathode of the cell or multiplier. This means that the area of the photocathode which is operative during the scanning of each individual picture element remains substantially the same. Spatial variations in photosensitivity of the cathode do not therefore contribute a new spatial noise component which cannot be corrected by the previous filter. This is not true if a camera tube is used as the final pickup element, since the photosensitive surface in that case requires a focused image of the transmission pattern of the target.

The scanning electromagnetic radiation is preferably in the near infrared visible or ultraviolet ranges and will therefore be referred to for convenience as "light." The source of scanning light may be a point source external to the target, a narrow beam being being directed from said source to the target via appropriate mechanical deflecting means, Alternatively, the source may be a distributed source material forming part of the target or formed as a layer thereon. In this case, successive elements of the source material (typically a phosphor) may be excited by a scanning electron beam. As a further alternative, the external source and mechanical scanner previously mentioned may be replaced by a cathoderay tube with a scanned phosphor screen which is optically imaged onto the bolometric target.

An important point in the choice of transmissive material is the absence of cumbersome cooling equipment in those cases where it appears possible to construct a device which can operate usefully at room temperature.

A further factor affecting the choice is the very low modulation depth of the thermal image formed on the target so that it is not worthwhile considering transmissive materials with an optimised temperature coefficient of transmission, when coupled with a suitable light source, of less than about 10% per degree centigrade.

The temperature-dependent transmission coefficient may arise from the presence of a steep absorption edge in the transmissive material, the spectral position of this edge varying with temperature.

Harding and his coworkers have constructed an image converter for direct viewing based on this effect (see the aforementioned article by W. R. Harding, C. Hilsum and D. C. Northrup). In their arrangement, the target of the image converter comprised an evaporated layer of amorphous selenium in addition to a coating of a bolometric material to absorb the thermal radiation. This target was flooded with light from a sodium lamp, of which the D lines (near 5890 Angstrom) appear to coincide with the absorption edge of the selenium. The thermal image on the target, corresponding to temperature variations in the scene, gives rise to slight local differences in absorption of the sodium light due to the shift of the absorption edge. An observer looking at the light transmitted by the target will thus "see" an actual thermal image with the darker areas corresponding to hotter objects.

To take adequate advantage of this phenomenon the device must employ either narrow-band scanning light whose wavelength is localised in the spectral region of the absorption edge, said light having an emission characteristic of opposite sign to said edge, which characteristic intersects said edge, or wide-band scanning light with a sharp cutoff which intersects said edge and whose slope has opposite sign to that of the edge. Filter means may be employed with a wide-band source to provide this sharp cutoff or to pass only a narrow spectral band of light in the region of said edge, this latter achieving the same effect as with a narrow-band source.

Figure 2:
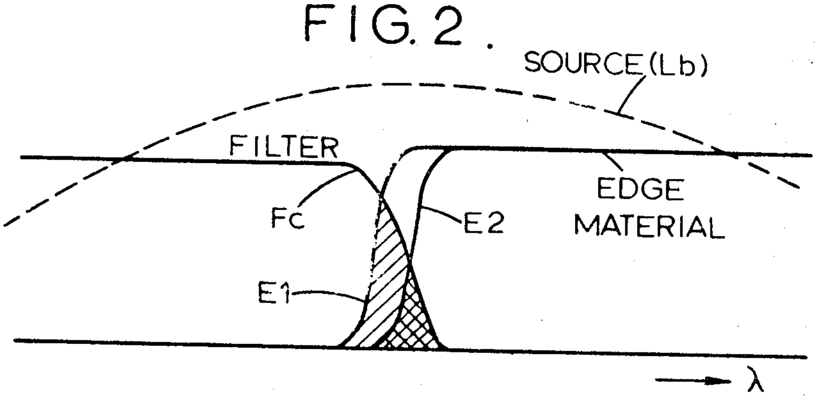

These cases are illustrated in FIGURES 1 and 2 of the accompanying diagrammatic drawings. In FIGURE 1 a narrow-band source (typically a laser or a monochromatic gas source) or a wide-band source with a band-pass filter provides a sharp peak of light emission at $L_n$ and a variable (shaded) part thereof is passed by the steep absorption edge of an appropriate transmission target. The position of the absorption edge varies locally with temperature and is shown in two different positions $E_1$–$E_2$.

In FIGURE 2, light from a broad-band source is indicated by curve $L_b$, but said band is cut off by a filter having a fixed cutoff edge $F_c$ at its low-frequency end.

Thus in both these cases the light passed by the transmissive material (and represented by the shaded portion) varies with movement of the absorption edge and hence with variation in the local temperature of the target.

The target will normally be placed inside a vacuum envelope to avoid convection phenomena. In that case the local equilibrium temperature of each small element of a very thin self-supporting target will in the first instance be determined by infrared radiation alone, in such a way that the total amount of infrared radiation absorbed is equal to the infrared radiation emitted. Small changes in the amount of infrared radiation received from the corresponding part of the scene lead to a new equilibrium temperature, which will be reached after a certain time delay due to the thermal capacity of the target material. This effect can be described in terms of a time constant $\tau_{rad}$, which can be shown to be approximately given by:

$$\tau_{rad}=\frac{\rho c L}{B T_t^3} \quad (1)$$

where $\rho$=specific weight of the target material,
$c$=specific heat of the target material,
L=target thickness ($\rho c$L=thermal capacity per cm.$^2$ of the target),
$B=4(e_1+e_2)\sigma$, with $e_1$, $e_2$=emissivity constants of the two sides of the target film, $\sigma$=radiation constant $=5.67\times10^{-12}$ watt-cm.$^{-2}$/deg.$^{-4}$,
$T_t$=temperature of the target in ° K.

In an alternative method of target construction the target material proper is applied as a thin surface coating to a thick support. In this case the time constant $\tau$ is given by $$\frac{1}{\tau}=\frac{1}{\tau_{rad}}+\frac{1}{\tau_{cond}} \quad (2)$$

where $\tau_{rad}$ is as defined above and $\tau_{cond}$ is an additional time constant arising because of the conduction of heat through the coating to the support. If it is assumed that the support is at a uniform temperature $\tau_{cond}$ can be shown to be given approximately by $$\tau_{cond}=\frac{\frac{\rho c L}{2}}{\frac{\pi}{4}\frac{k}{L}} \quad (3)$$

where the symbols have the same meaning as those above and $k$=thermal conductivity of the thin surface coating.

Figure 3:
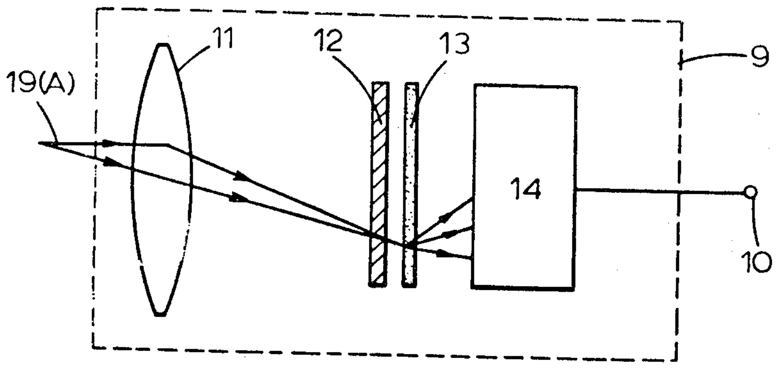
Figures 4, 5A:
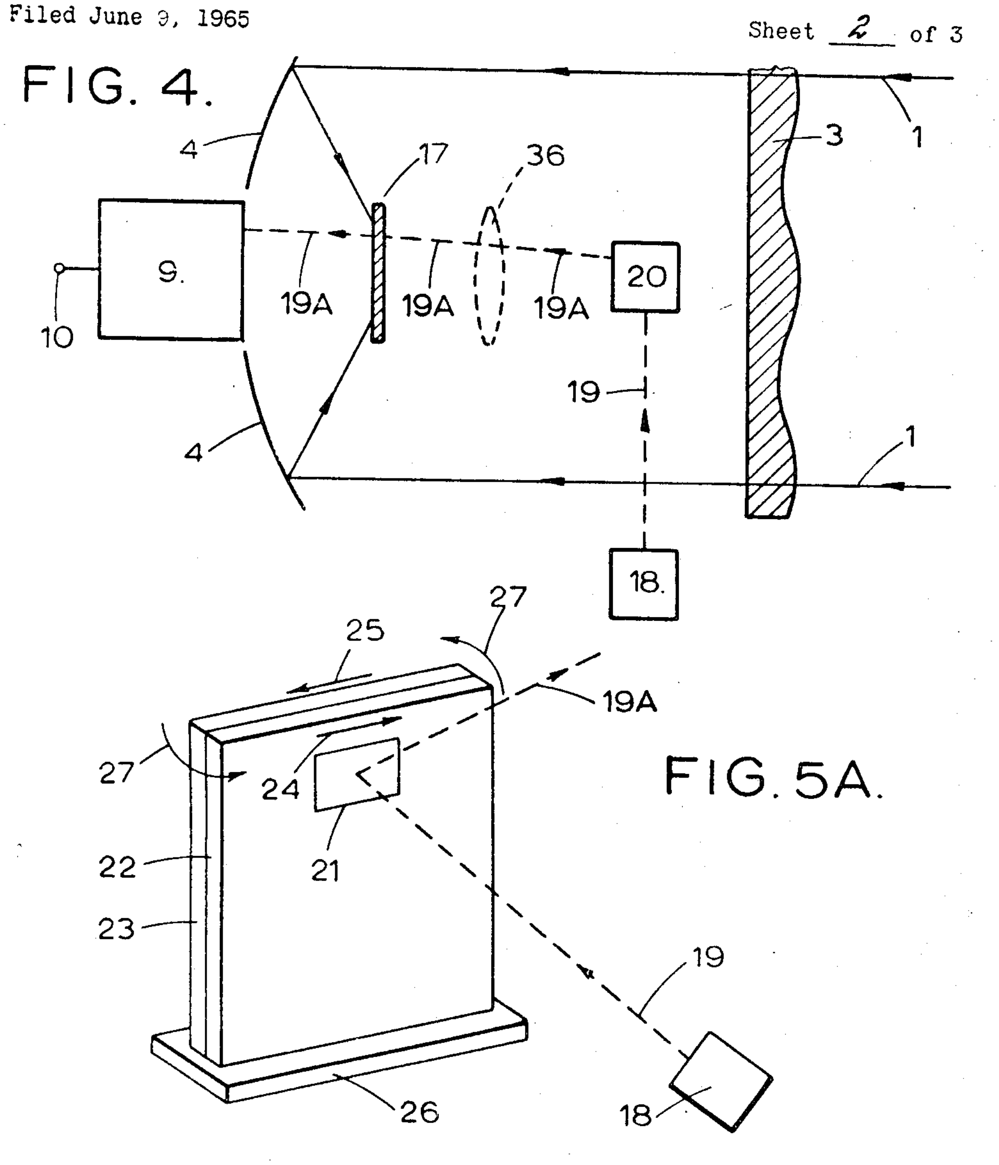
Figure 5B:
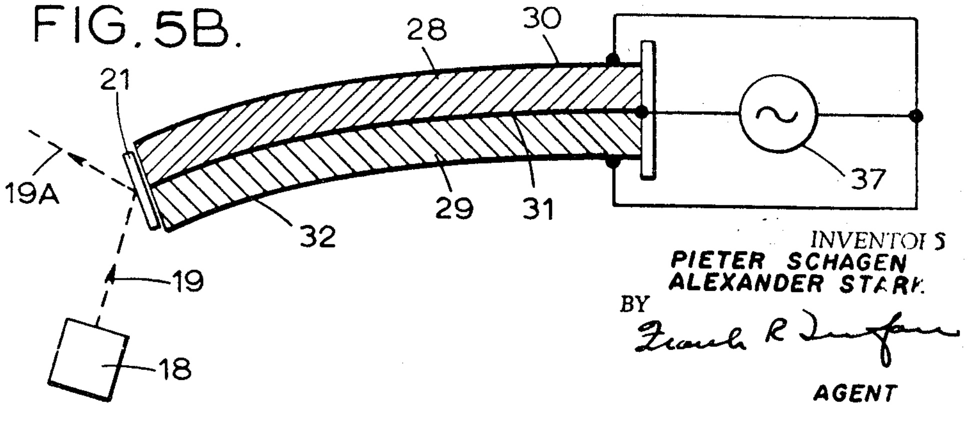
Figure 6:
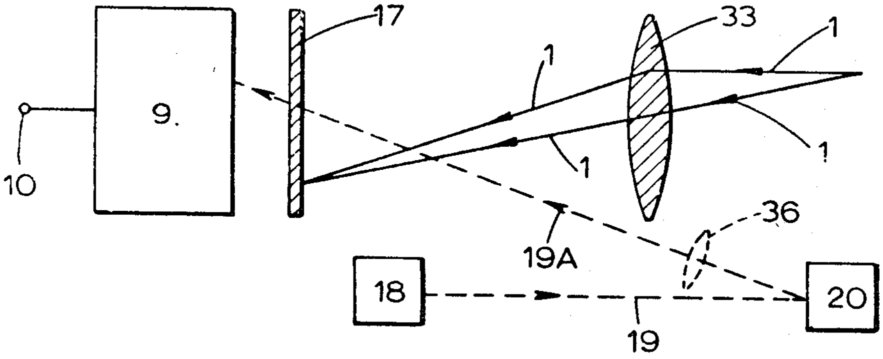
Figure 7:
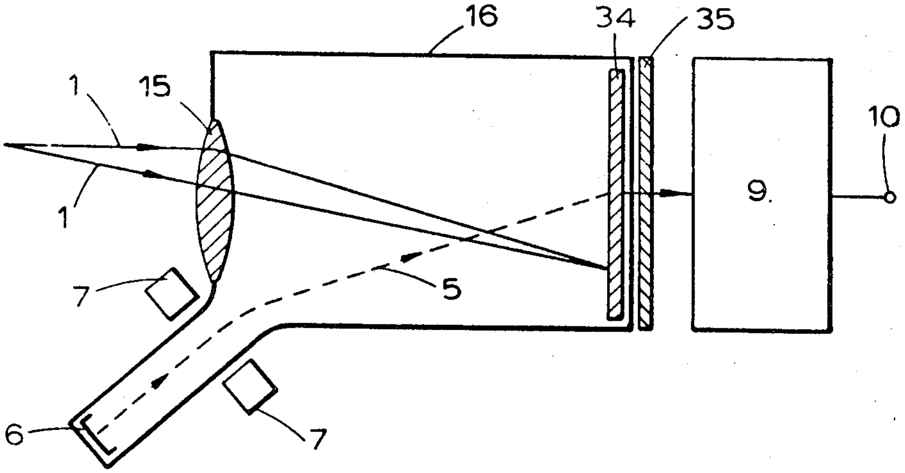

Specific embodiments of the invention will now be described by way of example with reference to FIGURES 3–7 of the accompanying diagrammatic drawings. In the drawings FIGURES 4, 6 and 7 show such embodiments and FIGURES 3, 5A and 5B show possible components thereof in more detail. In the figures similar items have been given, as far as possible, similar reference numerals.

In FIGURE 4 infrared rays 1 from a scene are focused by the usual Schmidt arrangement comprising an infrared transmissive plate 3 (which may be made for example, of the material known as Irtran II) and a spherical mirror 4 on to a target 17. The bolometric target 17 comprises a transmissive material having an absorption edge whose position in the spectrum varies with temperature. The target also comprises a material for forming an image of an object or scene in the form of local variations in the temperature of the target. Light 19 from a source 18 is scanned over the target by scanning means 20 so that some of it is transmitted and impinges upon conversion means 9 (which comprises a light detector such as a photocell or photomultiplier). The converter produces a video signal corresponding thereto at output terminal 10. This scanning light exhibits a large rate of change of intensity with wavelength at a wavelength which coincides with the wavelength at which the absorption edge occurs. This rate of change of scanning light intensity is of opposite sign to the slope of the absorption edge.

As described above with reference to FIGURES 1 and 2, the fact that the intensity of the light 19 which is available for actuating the conversion means 9 exhibits a large rate of change with respect to wavelength near the wavelength of the absorption edge of the material of the target 17, this rate of change being in opposite sense to that in the transmission factor of the material of the target 17, means that the video signal obtained at terminal 10 will depend quite strongly upon the exact position of the absorption edge relative to this wavelength region of large rate of change, and hence upon the temperature of that part of the target which is being utilised. This coincidence of said region and the absorption edge may be obtained in several ways.

The light 19 may, for example, comprises spectral components the majority of which coincide with the absorption edge of the target (see FIGURE 1). Thus the light may be obtained from a sodium lamp and the target may comprise selenium, for example, in the form of an amorphous layer evaporated on to a thin supporting film of $Al_2O_3$. The whole target is coated with a sodium-light-transparent material to absorb infrared radiation, and hence form an image of the object or scene, as described by Harding. The absorption edge of the selenium appears to coincide with the sodium D lines (which may be represented by curve $L_n$ in FIGURE 1).

Alternatively, a wide-band light source may be used in conjunction with a filter or filters to provide either the curve $L_n$ of FIGURE 1 or the curve $F_c$ of FIGURE 2. This filter may be effectively constituted by the response curve of the photocell or photomultiplier. The use of an ultraviolet transmitting filter with steep cutoff around 3.3–3.2 ev. enables the target to comprise evaporated ZnO as the absorption edge material. The source 18 may then be a P15 luminophor (ZnO) which has a strong emission band around 3.2 ev.

Preferably a laser is used as the source 18 for two reasons; (a) it produces virtually truly monochromatic light, and (b) it can produce an extremely narrow parallel beam which is very suitable for scanning. Aspect (a) obviates the need for the filters for producing the large rate of change of intensity of the light 19 with wavelength because the laser beam has the required properties. Aspect (b) permits the use of very small deflection angles in scanning because of the beam's inherent high resolution (fundamentally limited only by the spread in the beam due to diffraction according to the Rayleigh criterion).

Thus the source 18 may be a small helium-neon gas laser of which the 6328 A. radiation may be utilised in conjunction with the target 17. This target may then comprise a polycrystalline layer of CdS and CdSe mixed crystals in the correct proportion (about one part CdS to two parts CdSe) to give an absorption coefficient of the order of $10^4$ cm.$^{-1}$ at 1.96 ev. (=6328 A.). Alternatively, the helium-neon laser may be adjusted to provide 15,231 A. radiation for utilisation in conjunction with a target 17 of suitably prepared germanium. In this latter case a photoconductive cell will probably have to be used as the light detector which unfortunately may then lead to bandwidth restriction in the video signal because of the slow response of these cells. As a further alternative, the source 18 may be a neon-oxygen or argon-oxygen gas laser adapted to produce radiation of 8,446 A., which then may be utilized in conjunction with a target 17 of suitably prepared GaAs.

The scanning means 20 may be any suitable form of mechanical scanner. In spite of its simplified representation in one plane in the figure, the scanner is adapted to provide both line and field scans. It may, for example, comprise two systems of mirrors, each system being rotatable about axes mutually at right angles. Alternatively, it may comprise small vibrating mirrors mounted in a vacuum to avoid noise and dust problems. This last alternative is applicable especially to operation in conjunction with a laser source 18 because of the smaller deflection angles possible.

A disadvantage will be noted with the scanning means of FIGURE 4 (and of FIGURE 6, see below) in that the length of the path through the target traversed by the beam 19A varies with different angles of the scanning beam, thus causing variations in the amount of light transmitted. This disadvantage may be overcome by including a convex collimating lens 36 in the light path between the scanning means 20 and the target 17, in such a position that the deflection centre of the ray 19A lies at the focus of the lens. Light emerging from the lens will then always make the same angle with the target 17.

The use of a laser as the source 18 also makes it possible to use as the scanning means a pair of piezoelectric "bimorphs" with small flat mirrors attached, for the scanning in both line and field directions. For a discussion of these see C. Baldwin Sawyer: "The Use of Rochelle Salt Crystals for Electrical Reproducers and Microphones," Proc. I.R.E. 19, vol. 11, p. 2020, November 1931. A possible embodiment of these will be described with reference to FIGURE 5.

In FIGURE 5A the light 19 from the source 18 is directed on to a mirror 21 whence it is reflected as ray 19A. Rotation of the mirror about, for example, any axis perpendicular to the light ray 19 will cause the reflected ray 19A to sweep through double that angle, thus scanning in one dimension a target on which it may be incident. The mirror is attached to a plate 22 of a piezoelectric material, for example, Rochelle salt, which is in turn preferably cemented to a similar plate 23 (although the plates 22 and 23 may be held together simply by mechanical pressure with reliance placed on the frictional contact). The plates are cut from a crystal so that their major faces are substantially perpendicular to the electric or *a*-axis, their other faces lying substantially parallel to the *b*- and *c*-axes, respectively. A major face of one is cemented to the corresponding face of the other in such a way that the faces of one which are perpendicular to the *b*-axis lie substantially parallel to the faces of the other which are perpendicular to the *c*-axis. This ensures that when the plates move under the influence of an applied electric field they move in opposition.

A field may be applied by connecting an alternating voltage source between two coatings of conductive material, e.g., tin foil (not shown), one on either exposed major face. When the applied field is in one direction, the plates 22 and 23 tend to move in shear as shown by arrows 24 and 25, respectively. One edge of the composite plate is clamped to a base plate 26. The result is that the top edge of the composite plate twists as shown by the arrows 27, thus rotating the mirror. Similarly, when the direction of the applied field reverses on the next half-cycle, the mirror is rotated in the opposite direction. In this way the beam 19A can be made to sweep horizontally through a given angle in synchronism with the applied alternating voltage, thus supplying line scan for the target. Similarly, another "bimorph" and miror may be used to additionally deflect the beam 19A in a vertical direction, thus providing field scan.

A very suitable material for use as the piezoelectric material of the "bimorphs" is available from Mullard Limited under the name "Piezoxide." In particular, two rods 28, 29 of this material (type numbers MB8000–MB8003) which have silver plated faces 30, 31, 32 for electrodes may be fixed together along one of these faces, as shown in FIGURE 5B to form an assembly analogous to the well known bimetallic strip. If a field is applied in alternate directions across these two rods, one rod will expand and the other contract. If the field is supplied from an alternating voltage source 37, then the mirror will again vibrate in synchronism with the applied field. This will be done very efficiently if the mechanical resonant frequency of the assembly is equal to that of the applied field. Again, two of these assemblies may be utilized to provide both line and field scans.

In the embodiment of FIGURE 4 the relative positions of the scanner 20 and the conversion means 9 may be reversed.

The conversion means 9 may include the additional components shown in FIGURE 3. Light 19A from the target 17 may be focused by lens 11 on to a correction filter 12 manufactured as described in our aforementioned patent, thus reducing the "dirty window" effect. This can be done, in accordance with the patent, by making the device "look" initially at a scene without temperature variations. The light output should then be constant across the whole target, but will in fact vary as a result of local irregularities in the target. It is now possible to place a photographic plate with a linear characteristic in the image plane of a lens inserted between target and light-detector. The correct exposure of this photographic plate to the light transmitted by the target when scanned will, after suitable processing, produce a correction filter which can be inserted permanently with the lens in the same position between target and light detector. The light transmitted by this filter is diffused by a diffusing screen 13 and impinges upon a light-detector 14, for example, a photomultiplier. The diffusing screen is inserted so that substantially the same area, or a sufficiently large area, of the photomultiplier is used for each position of the electron beam, thus reducing substantially the creation of spatial noise which would otherwise arise because of the ultilisation of different parts of the photomultiplier cathode for different positions of scan. Of course, the correction filter may be omitted, in which case the lens 11 may also be omitted.

FIGURE 6 shows another embodiment of the invention similar to that shown in FIGURE 4. Again identical reference numerals have been given to equivalent parts in the two figures. This embodiment has the advantage that the Schmidt system has been dispensed with and replaced by a simple lens system for focusing the infrared scene on to the target 17. This is shown for convenience as a single lens 33.

As stated above with reference to FIGURE 4 evaporated ZnO provides a suitable absorption edge transmissive target material and it may also be used as a luminophor to provide the necessary incident scanning light. Possibilities therefore exist for combining the luminophor and transmissive material in the target to form another embodiment of the invention. An example of an embodiment which works in this way will be described with reference to FIGURE 7.

In this embodiment an electron beam 5 is produced in an evacuated bulb 16 by means of an electron gun 6 with an accelerating potential of about 1 kv. The beam is caused to scan a target 34 under the action of scanning means 7. Infrared radiation 1 from a scene is focussed on the target 34 by means of an infrared transmitting lens 15 which may be made for, example, of Irtran II. This lens is sealed into the wall of the bulb. It is preferable that the electrons be derived from a cold cathode, for example, a field emission, tunnel emission, photoemission, or n-p junction emission cathode. If a thermionic emission cathode is used, the electron optics are preferably bent so that thermal electromagnetic radiation from the cathode not be incident on the target 34.

The target 34 comprises a surface coating of ZnO mixed with SiO evaporated on a self-supporting transparent film of $Al_2O_3$ or collodion. It is rather unsatisfactory to evaporate the coating directly on to the glass wall of the bulb because of the resulting conduction, in operation, of the heat image in a lateral direction in the glass, which results in a loss of definition. The SiO serves as an absorber of the infrared radiation. The ZnO layer is so deposited that the part of it nearest the adjacent glass wall of the bulb is especially efficient as an absorption edge filter, while the part of it furthest away from the wall is especially efficient as a luminophor. This may be done by suitably altering the evaporation conditions for the last few hundred Angstrom of the coating, possibly also omitting the SiO when this later part is being deposited.

The electron beam is subjected to an accelerating potential of about 1 kv. so that the depth of penetration of the electrons impinging upon the target is limited to something of the order of 200 A. Thus the electrons cause only the ZnO on one face of the target to emit electromagnetic radiation. This radiation then is transmitted by the ZnO on the other face in proportion to the temperature of that other face, this temperature being determined by the local infrared radiation absorbed by the SiO. The transmitted output radiation passes through the wall of the bulb, through an ultraviolet transmitting interference filter 35 having a step cutoff around 3.3–3.2 ev., and is then incident upon conversion means 9 similar to that described above with reference to FIGURE 3. Thus scanning of the target by the beam 5 results in a video-signal being obtained at terminal 10.

It is not essential that the spectral position of the curves $L_n$ or $F_c$ be constant with variation in temperature, although preferably it is substantially so. It may ideally move in the opposite wavelength direction to the absorption edge in response to the same changes of temperature of the target. It may even move in the same direction (if that is unavoidable in practice) provided that the rate of movement is considerably different from that of the absorption edge.

If a device giving direct viewing facilities is desired, the terminal 10 in the arrangements of FIGURES 4, 6 and 7 may be connected via suitable amplifiers, black-level manipulators etc., to the control electrode of a cathode ray tube. This tube may be scanned by using the same circuitry as that used to drive the deflecting means 7 or 20, thus providing a substantial reduction in circuitry needed. Moreover, the same high voltage supplies may be used for the gun 6 and the gun of the cathode ray tube of FIGURE 7. When using such a device with the asymmetrical tube of FIGURE 7 the effects of trapezium distortion of the image can be overcome by using for the display a cathode ray tube which is correspondingly asymmetrical (this will be referred to as a "compensated display" device).

The scanning waveform used need not be the usual "sawtooth." It may instead, for example, be sinusoidal, using the straightest portions of the sine-wave for scanning the actual image. A sinusoidal waveform is especially suited for driving the bimorphs described with reference to FIGURE 5. Moreover, the nonlinearity of such a scan will not distort the display if the pickup and display tubes form a compensated display device, as aforesaid.

What we claim is:

1. An infrared image device comprising a bolometric target positioned to receive an infrared image, said target comprising a transmissive material having a temperature dependent transmission coefficient for electromagnetic radiation of a given wavelength and a material for forming a thermal image of an object or scene in the form of local variations of the temperature of the target, means for scanning said target transmissive material with electromagnetic radiation of said given wavelength so that successively scanned discrete elements of the target sequentially transmit output radiation that is a proportion of the electromagnetic radiation with which it is scanned, said output radiation being modulated by the local variation of said transmission coefficient with temperature, and conversion means responsive to said output radiation for converting same to a video signal.

2. A device as claimed in claim 1 wherein said transmissive material exhibits a temperature dependent transmission coefficient that arises from the presence of a steep absorption edge in said material at approximately said given wavelength, the spectral position of said edge being variable as a function of temperature, and wherein the transmission characteristic of the combination of the scanning electromagnetic radiation, the light path between said scanning radiation and said conversion means, and said conversion means, at the spectral wavelength of said edge, exhibits a slope that is opposite in sign to that of said edge.

3. A device as claimed in claim 2 wherein said scanning radiation means includes a sodium lamp source and the transmissive material comprises an evaporated layer of amorphous selenium.

4. A device as claimed in claim 2 wherein said scanning radiation means includes a luminophor layer on said target and means for scanning an electron beam across said luminophor.

5. A device as claimed in claim 4 wherein the luminophor and the transmissive material both comprise evaporated ZnO.

6. A device as claimed in claim 2 wherein said scanning radiation means includes a laser energy source.

7. A device as claimed in claim 6 wherein the laser comprises a helium-neon gas laser arranged to emit radiation of 6328 A., the target comprising a polycrystalline layer of mixed Cd and CdSe crystals.

8. A device as claimed in claim 2 further comprising a diffusing screen positioned in the path of said output radiation between said target and said conversion means.

9. A device as claimed in claim 2 wherein an optical filter is included in an image plane of said output radiation, said filter having a negative image of the spatial noise in the output radiation of said device.

10. An image converter comprising a target having a layer of material having an optical transmission characteristic that varies with temperature for radiation of a given wavelength and a layer of radiation energy absorbing material for forming a thermal image on the target, means for projecting a radiation image onto said target, a source of electromagnetic radiation of said given wavelength, means for scanning said electromagnetic radiation across said target so that said target sequentially transmits said radiation in proportion to the magnitude of absorbed energy thereat, and conversion means positioned to receive the electromagnetic radiation transmitted through said target for converting said radiation into an electric signal.

11. A converter as claimed in claim 10 wherein said optical transmission layer comprises a material that exhibits an absorption edge at said given wavelength, the wavelength of said edge being variable with temperature, and wherein said radiation source exhibits a large rate of change of intensity as a function of wavelength at said given wavelength.

12. A converter as claimed in claim 11 wherein said radiation source comprises a wide-band light source in combination with one or more light filters that produce a sharp cutoff in light intensity at said given wavelength.

13. A converter as claimed in claim 12 wherein said scanning means comprises first and second plates of piezoelectric material sandwiched together, a mirror fastened to the surface of one of said plates in the path of the light from said light source, and means for applying a varying electric field to said plates.

References Cited

UNITED STATES PATENTS

| | | | |
|---|---|---|---|
| 2,563,472 | 8/1951 | Leverenz | 250—83.3 |
| 2,705,758 | 4/1955 | Kaprelian | 250—83.3 |
| 2,824,235 | 2/1958 | Hahn | 250—83.3 |
| 2,879,424 | 3/1959 | Garbuny | 250—83.3 |
| 3,130,309 | 4/1964 | Snyder | 250—83.3 |
| 3,370,172 | 2/1968 | Hora. | |

ROBERT L. GRIFFIN, *Primary Examiner.*

J. A. ORSINO, Jr., *Assistant Examiner.*

U.S. Cl. X.R.

178—6.8, 7.5; 250—83.3; 313—65

PO-1050
(5/69)

UNITED STATES PATENT OFFICE
CERTIFICATE OF CORRECTION

Patent No. 3,444,322 Dated May 13, 1969

Inventor(s) PIETER SCHAGEN ET AL

It is certified that error appears in the above-identified patent and that said Letters Patent are hereby corrected as shown below:

Column 1, line 43, "is" (second occurrence) should read -- it -- ; Column 10, line 9, "Cd" should read -- CdS -- ;

SIGNED AND
SEALED
JUL 14 1970

(SEAL)
Attest:

Edward M. Fletcher, Jr.
Attesting Officer

WILLIAM E. SCHUYLER, JR.
Commissioner of Patents